(12) United States Patent  
Dandekar et al.

(10) Patent No.: US 7,185,945 B2
(45) Date of Patent: Mar. 6, 2007

(54) STRUCTURAL ASSEMBLY FOR VEHICLES

(75) Inventors: Bhushan W. Dandekar, Rochester Hills, MI (US); Dmitriy V. Mazur, West Bloomfield, MI (US); Matthew B. Rombach, Davisburg, MI (US)

(73) Assignee: General Motors Corporation, Detroit, MI (US)

( * ) Notice: Subject to any disclaimer, the term of this patent is extended or adjusted under 35 U.S.C. 154(b) by 134 days.

(21) Appl. No.: 10/913,934

(22) Filed: Aug. 6, 2004

(65) Prior Publication Data

US 2006/0028052 A1    Feb. 9, 2006

(51) Int. Cl.
*B60J 7/00*    (2006.01)

(52) U.S. Cl. .......................... 296/187.09; 296/203.01; 296/203.03; 296/205

(58) Field of Classification Search ........... 296/187.09, 296/203.03, 187.03, 193.09, 203.01, 205
See application file for complete search history.

(56) References Cited

U.S. PATENT DOCUMENTS

| 6,152,521 | A * | 11/2000 | Hayashi et al. ........ 296/187.09 |
| 6,695,393 | B1 * | 2/2004 | Aouadi et al. ......... 296/203.01 |
| 6,705,668 | B1 * | 3/2004 | Makita et al. ......... 296/187.03 |

* cited by examiner

*Primary Examiner*—Lori L. Coletta
(74) *Attorney, Agent, or Firm*—Laura C. Hargitt

(57) ABSTRACT

A structural assembly for a vehicle includes a structural member extending longitudinally. The structural assembly also includes an insert disposed within and extending longitudinally along at least a portion of the structural member and having at least one corrugation to act as a crush initiator during an axial impact on the structural assembly.

8 Claims, 4 Drawing Sheets

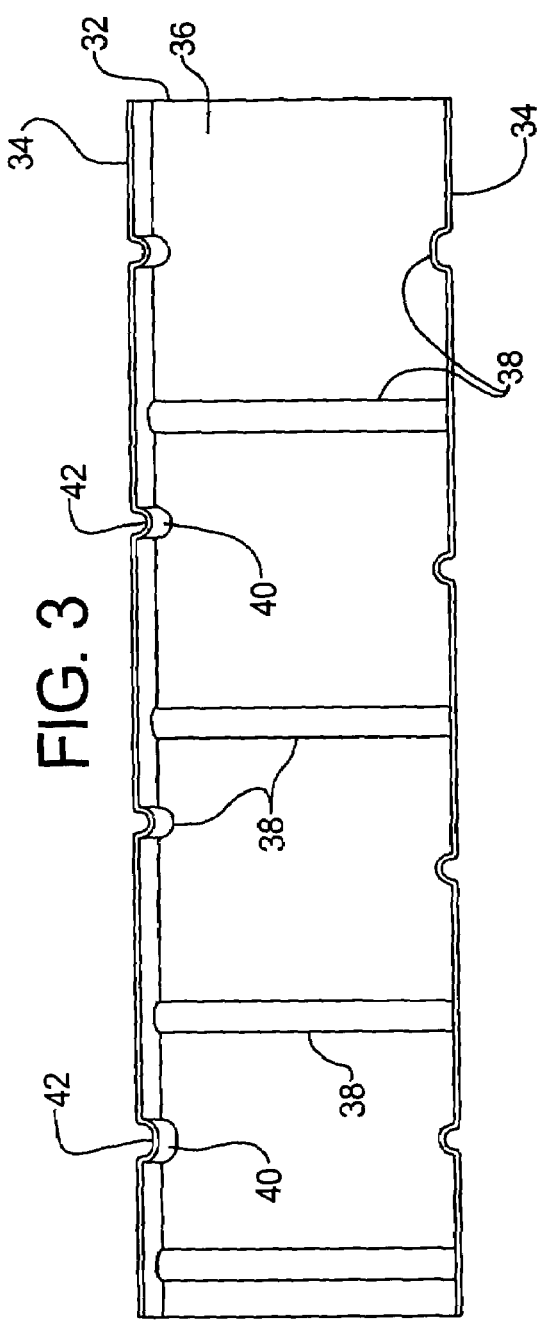
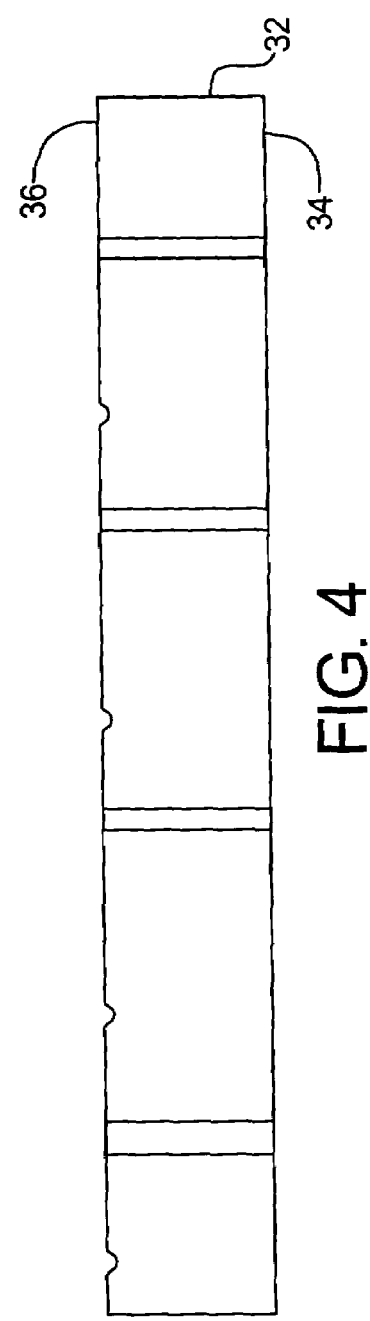
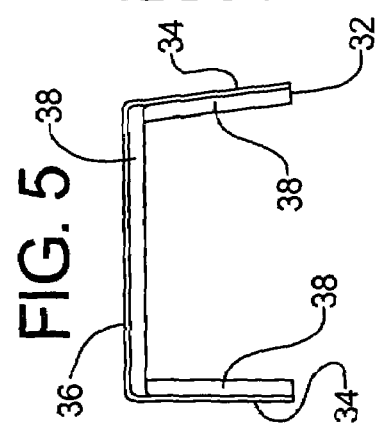

STRUCTURAL ASSEMBLY FOR VEHICLES

TECHNICAL FIELD

The present invention relates generally to vehicles and, more specifically, to a structural assembly for a vehicle.

BACKGROUND OF THE INVENTION

It is known to construct vehicles such as automotive vehicles with thin walled structural members such as longitudinal rails. Longitudinal rails are typically closed sections. For automotive structures, front longitudinal rails are the primary energy absorbing members during a frontal impact. However, rail length is restricted by styling and leads to limited energy absorbing capacity. Furthermore, rail size is restricted by engine compartment packaging and also limits energy absorbing capacity.

Front longitudinal rails that carry the load and absorb energy during a crash are traditionally designed with crush initiators to ensure a proper folding mechanism. However, crush initiators significantly reduce load carrying capacity of the longitudinal rails. Then, to increase the load capacity of these rails, internal reinforcements and/or honeycomb type material is used. The design of internal reinforcements can be difficult and often compromise the principal folding mechanism of the parent structure. Further, the traditional design of internal reinforcements does not have a proper design process, making it time consuming, costly, and prone to errors.

As a result, it is desirable to provide a new reinforcement for a structural member of a vehicle. It is also desirable to provide an internal reinforcement for a structural member of a vehicle. It is further desirable to provide an internal reinforcement for a structural member of a vehicle that is less time consuming and costly. Therefore, there is a need in the art to provide a new reinforcement for a structural member of a vehicle that meets these desires.

SUMMARY OF THE INVENTION

It is, therefore, one object of the present invention to provide a new reinforcement for a thin walled structural member.

It is another object of the present invention to provide a new reinforcement for longitudinal rails of a vehicle.

To achieve the foregoing objects, the present invention is a structural assembly for a vehicle including a structural member extending longitudinally. The structural assembly also includes an insert disposed within and extending longitudinally along at least a portion of the structural member and having at least one corrugation to act as a crush initiator during an axial impact on the structural assembly.

One advantage of the present invention is that a structural assembly is provided for a vehicle that locally and internally reinforces a thin walled structural member. Another advantage of the present invention is that the structural assembly incorporates an insert that is simple and relatively inexpensive. Yet another advantage of the present invention is that the insert has corrugations at the axial folds of the parent structural member, resulting in robust and repeatable axial crush mode. Still another advantage of the present invention is that the insert ensures a robust crush mode of longitudinal rails, resulting in an overall better and repeatable impact performance. A further advantage of the present invention is that the insert allows front longitudinal rails to sustain a higher load capacity over a longer period of time, resulting in an efficient structure. Yet a further advantage of the present invention is that the insert can be used on most vehicles to improve the vehicle's frontal impact performance. Still a further advantage of the present invention is that the insert achieves a robust and impact-efficient vehicle front-end structure, allowing for wider powertrain selection. Another advantage of the present invention is that the insert allows a shorter motor vehicle front-end, enabling more aggressive styling. Yet another advantage of the present invention is that the insert does not have to extend the entire length of the member, thus allowing optimization of energy absorbing capacity, mass, and cost.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 3 is a front elevational view of an insert, according to the present invention, of the structural assembly of FIG. 2.

FIG. 4 is a plan view of the insert of the structural assembly of FIG. 2.

FIG. 5 is a side elevational view of the insert of the structural assembly of FIG. 2.

DESCRIPTION OF THE PREFERRED EMBODIMENT

Figure 1:
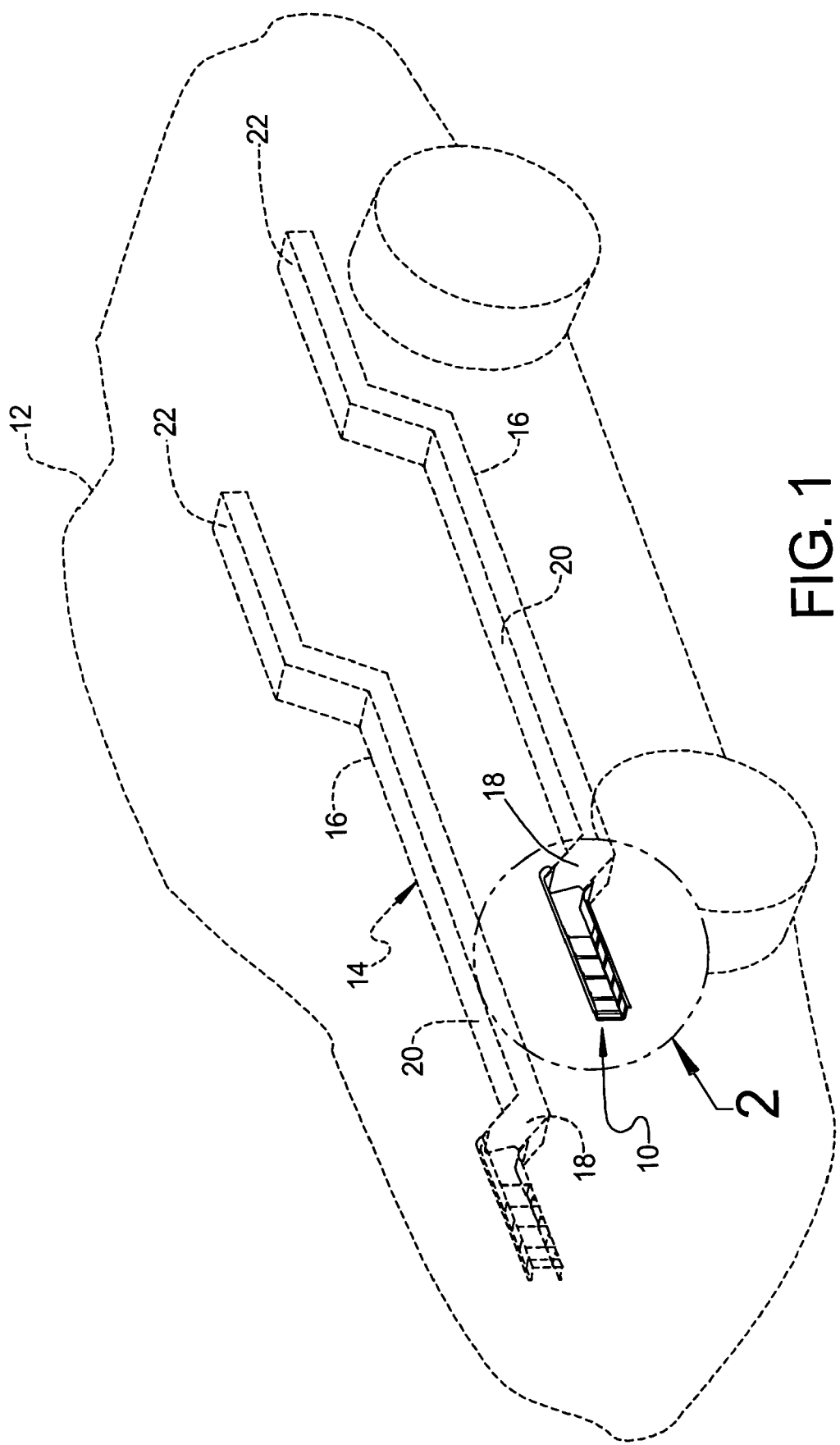
FIG. 1 is a perspective view of a structural assembly, according to the present invention, illustrated in operational relationship with a vehicle.

Referring to the drawings and in particular FIG. 1, one embodiment of a structural assembly 10, according to the present invention, is generally shown for a vehicle 12. The vehicle 10 includes a vehicle frame, generally indicated at 14. The vehicle frame 14 has at least one, preferably a pair of rails 16. The rails 16 are spaced laterally in parallel relationship with respect to each other and extend longitudinally forwardly and rearwardly, respectively. Each of the rails 16 has a forward portion 18, a central portion 20, and a rear portion 22. In one embodiment, the forward portion 18 includes the structural assembly 10. It should be appreciated that, in another embodiment, the rear portion 22 may also include the structural assembly 10. It should also be appreciated that, except for the structural assembly 10, the vehicle 12 is conventional and known in the art.

Referring to FIGS. 1 through 5, the structural assembly 10 includes a structural member such as, for example, a hat member 24 including two lateral sides 26 extending longitudinally and a web 28 therebetween extending vertically and longitudinally. The web 28 and sides 26 define a generally U-shaped cross-section. The hat member 24 also includes marginal flanges 30 extending vertically and longitudinally from the sides 26 and generally parallel to the web 28 to form a generally "hat" shaped configuration. The hat member 24 is made of a metal material. It should be appreciated that the hat member 24 is part of the rail 16 and forms the forward portion 18 thereof.

The structural assembly 10 also includes an internal reinforcement or insert 32, according to the present invention, disposed within the structural member, in this embodiment, the hat member 24. The insert 32 includes two lateral sides 34 extending longitudinally and a web 36 therebetween extending vertically and longitudinally. The web 36 and sides 34 define a generally open cross-section. The insert 32 includes at least one, preferably a plurality of corrugations 38. The corrugations 38 are disposed on at least one of, preferably the sides 34 and web 36. The corrugations 38 are spaced longitudinally. Each corrugation 38 has a projection portion 40 extending inwardly from the interior of the side 34 and/or web 36 to form a recess 42 on the exterior of the side 34 and/or web 36. The projection portion 40 and recess 42 have a generally arcuate cross-sectional shape. The insert 32 is made of a metal material. The insert 34 is a monolithic structure being integral, unitary, and one-piece.

Figure 2:
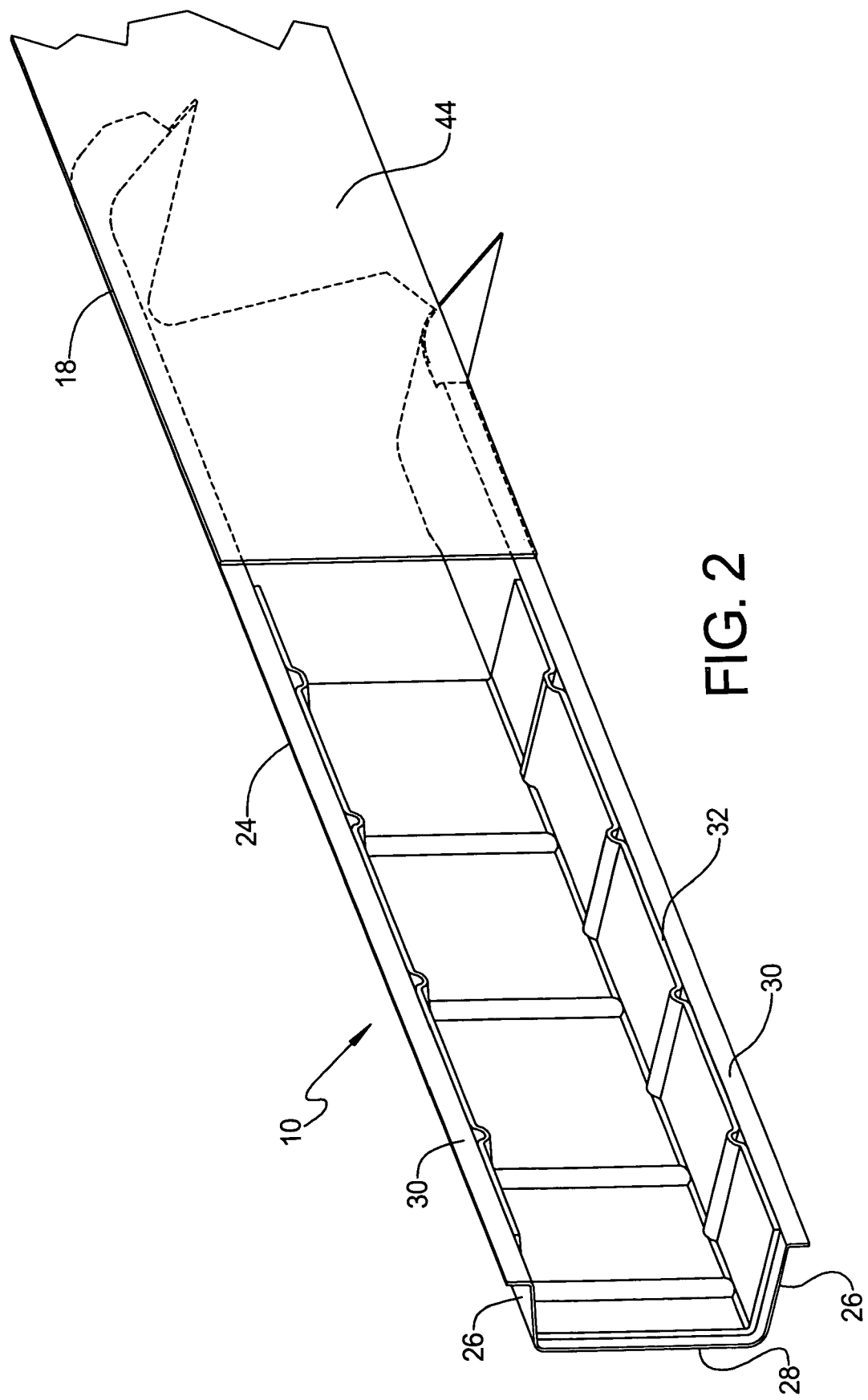
FIG. 2 is an enlarged perspective view of a portion of the structural assembly in circle 2 of FIG. 1.

Referring to FIG. 2, the sides 34 and web 36 of the insert 32 are disposed in abutting relationship with the sides 26 and web 28 of the hat member 24. The sides 34 and web 36 of the insert 32 are fixedly secured to the sides 26 and web 28 of the hat member 24. More specifically, the sides 34 and web 36 of the insert 32 are spot welded to the sides 26 and web 28 of the hat member 24 at predetermined points along the longitudinal expanse thereof as illustrated in FIG. 2. It should be appreciated that the insert 32 may be used in any vehicle application in which the structural member crushes axially.

The structural assembly 10 further includes a second structural or closure member 44 closing the hat member 24. In one embodiment, the closure member 44 is planar and generally rectangular in shape. In another embodiment, the closure member 44 is another hat member. The closure member 44 extends vertically and longitudinally. The closure member 44 is disposed in abutting relationship with the flanges 30 of the hat member 24. The closure member 44 is secured to the hat member 24 by suitable means such as spot welding the closure member 44 to the flanges 30 of the hat member 24 at predetermined points along the longitudinal expanse thereof. It should be appreciated that, if the closure member 44 is a hat member, the insert 32 may be disposed within the closure member 44. It should also be appreciated that the structural assembly 10 may include two inserts 32, one disposed within the hat member 24 and the other disposed within the closure member 44. It should be further appreciated that the hat member 24 and closure member 44 may have any suitable cross-sectional hat shape to form a cross-sectional shape of the rail 16 such as rectangular, hexagonal, or octagonal.

Figure 6:
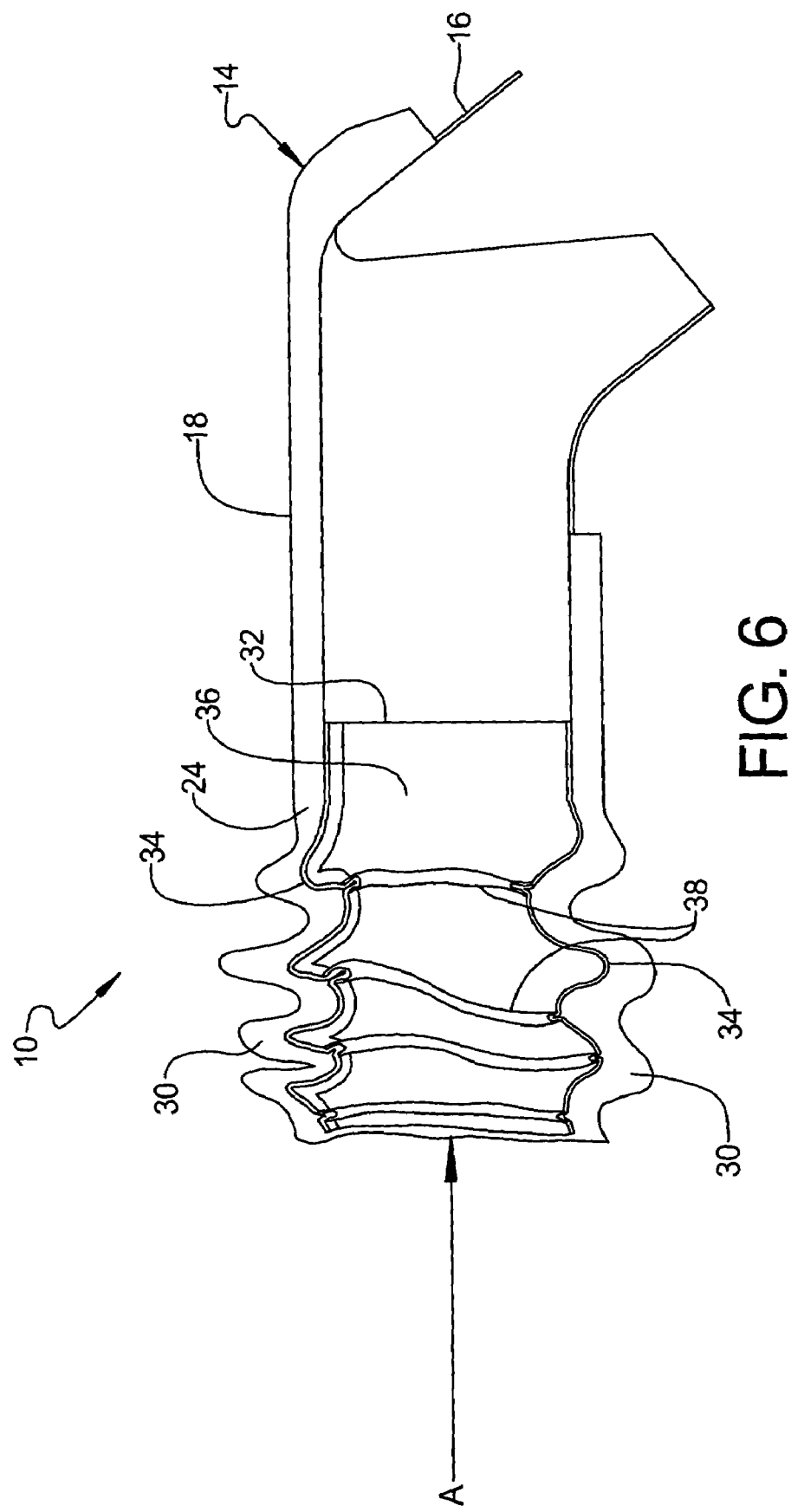
FIG. 6 is a front elevational view of the structural assembly of FIG. 1 illustrating an impact.

Referring now to FIG. 6, the vehicle 12 has experienced a collision as indicated by the arrow A, resulting in damage to its front and specifically causing crush of the forward portion 18 of the vehicle frame 14. However, due in part to the structural assembly 10 of the forward portion 18 of the rail 16, the forward portion 18 of the rail 16 will deform in a predetermined accordion-like manner. As a result, more energy is absorbed by the forward portion 18 of the rail 16 of the vehicle frame 14, resulting in lower deceleration rates of the vehicle 12 and a greater dissipation of the energy of the collision because the axial load is sustained at a constant level over a longer period of time. Thus, the insert 32 provides a robust pre-designed crush mode and improves efficiency and increases load carrying capacity of the structure. It should be appreciated that, during an axial crush event, the insert 32 acts as a crush initiator and a stabilizer without sacrificing the parent structural member's load carrying capacity. It also should be appreciated that the insert 32 improves crush characteristics and energy absorption capacity of thin walled structural members. It should further be appreciated that the structural assembly 10 may be used in any application where similar load carrying members crush axially to absorb energy.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A structural assembly for a vehicle comprising:
   a structural member extending longitudinally; and
   an insert disposed within and extending longitudinally along at least a portion of said structural member, said insert having a pair of side walls extending longitudinally and a web extending between said side walls, each of said side walls and said web having a plurality of corrugations spaced longitudinally, said corrugations in said web being non-aligned with said corrugations in said side walls, said corrugations act as a crush initiator during an axial impact on the structural assembly.

2. A structural assembly as set forth in claim 1 wherein said insert has a cross-section complementary to a cross-section of said structural member.

3. A structural assembly as set forth in claim 1 wherein each of said corrugations has a projection portion extending inwardly.

4. A structural assembly as set forth in claim 1 wherein said structural member has marginal flanges extending from said side walls.

5. A structural assembly as set forth in claim 1 wherein said structural member is a rail extending longitudinally.

6. A frame for a vehicle comprising:
   a pair of rails extending longitudinally and having a forward portion and a rearward portion; and
   at least one of said forward portion and said rearward portion having a structural assembly;
   wherein said structural assembly comprises a structural member and an insert disposed within said structural member, said insert having a pair of side walls extending longitudinally and a web extending between said side walls, each of said side walls and said web having a plurality of corrugations spaced longitudinally, said corrugations in said web being non-aligned with said corrugations in said side walls, said corrugations act as a crush initiator during an axial impact on said structural assembly.

7. A frame as set forth in claim 6 wherein each of said corrugations has a projection portion extending inwardly.

8. A frame for a vehicle comprising:
   a pair of rails extending longitudinally and having a forward portion and a rearward portion; and
   at least one of said forward portion and said rearward portion having a structural assembly;
   wherein said structural member has a pair of side walls extending longitudinally, a web extending between said side walls, and marginal flanges extending from said side walls, each of said side walls and said web having a plurality of corrugations spaced longitudinally, said corrugations in said web being non-aligned with said corrugations in said side walls, said corrugations act as a crush initiator during an axial impact on said structural assembly.

* * * * *